United States Patent
Meersseman et al.

(10) Patent No.: US 12,297,650 B2
(45) Date of Patent: May 13, 2025

(54) FLOOR PANEL AND METHOD FOR MANUFACTURING A FLOOR PANEL

(71) Applicant: FLOORING INDUSTRIES LIMITED, SARL, Bertrange (LU)

(72) Inventors: Laurent Meersseman, Mont de l'Enclus (BE); Luc Vanhastel, Tielt (BE); Pieter-Jan Sabbe, Merelbeke (BE); Benjamin Clement, Waregem (BE)

(73) Assignee: UNILIN, BV, Wielsbeke (BE)

( * ) Notice: Subject to any disclaimer, the term of this patent is extended or adjusted under 35 U.S.C. 154(b) by 14 days.

(21) Appl. No.: 18/034,927

(22) PCT Filed: Nov. 4, 2021

(86) PCT No.: PCT/IB2021/060214
§ 371 (c)(1),
(2) Date: May 2, 2023

(87) PCT Pub. No.: WO2022/101743
PCT Pub. Date: May 19, 2022

(65) Prior Publication Data
US 2024/0018790 A1    Jan. 18, 2024

(30) Foreign Application Priority Data
Nov. 10, 2020    (EP) ..................... 20206709

(51) Int. Cl.
*B32B 3/10*    (2006.01)
*B44C 1/24*    (2006.01)
(Continued)

(52) U.S. Cl.
CPC .............. *E04F 15/107* (2013.01); *B44C 1/24* (2013.01); *E04F 15/02161* (2013.01); *E04F 15/105* (2013.01)

(58) Field of Classification Search
None
See application file for complete search history.

(56) References Cited

U.S. PATENT DOCUMENTS

2020/0325689 A1*    10/2020    Li ........................... E04F 13/18

FOREIGN PATENT DOCUMENTS

| EP | 1974953 A2 | 10/2008 |
|---|---|---|
| EP | 2883712 A1 | 6/2015 |

(Continued)

OTHER PUBLICATIONS

International Search Report from corresponding PCT Application No. PCT/IB2021/060214, Feb. 10, 2022.

(Continued)

*Primary Examiner* — Christopher M Polley
(74) *Attorney, Agent, or Firm* — Workman Nydegger

(57) ABSTRACT

A floor panel includes a substrate, a decorative layer and a transparent component. The decorative layer is positioned between the substrate and the transparent component. At least one of the substrates, the decorative layer and the transparent component has a thermoplastic synthetic material. The transparent component has an upper surface opposite the decorative layer. The floor panel further includes an enhancement component provided on the upper surface of the transparent component. A thickness of the enhancement component varies along a cross section of the floor panel.

20 Claims, 6 Drawing Sheets

(51) Int. Cl.
    *E04F 15/02*    (2006.01)
    *E04F 15/10*    (2006.01)

(56) References Cited

FOREIGN PATENT DOCUMENTS

| JP | 2016010875 A | 1/2016 |
| WO | 2018065859 A1 | 4/2018 |
| WO | 2020208615 A1 | 10/2020 |

OTHER PUBLICATIONS

Extended European Search Report from corresponding EP Application No. 20206709.6, Apr. 15, 2021.

* cited by examiner

FLOOR PANEL AND METHOD FOR MANUFACTURING A FLOOR PANEL

BACKGROUND

The present invention relates to a floor panel and a method for manufacturing a floor panel.

More particularly, the invention relates to a floor panel comprising at least a substrate, a decorative layer and a translucent or transparent component over said decorative layer. The invention is particularly interesting for being applied with floor panels wherein at least one of said substrate, said decorative layer and said transparent component comprises thermoplastic synthetic material.

Floor panels as above are well-known as such. For example, this may relate to so-called vinyl tiles or so-called LVT (Luxury Vinyl Tiles), or to wall-to-wall coverings. In said cases, the thermoplastic material relates to so-called soft PVC (PolyVinyl Chloride), or PVC comprising a percentage of plasticizers, for example, of 5 to 20 percent by weight or even to 35 percent by weight or more. Herein, the decorative layer relates to a print, the decor of which may form a representation of a wood or stone pattern or any other pattern, such as a fancy pattern. Over the decorative layer of the panel, a transparent component is provided. The transparent component protects the decorative layer from wear and increases the wear resistance of the floor panel. On said transparent component a lacquer and/or a relief or structure, such as a wood or stone structure, may be provided. Due to the properties of the thermoplastic materials used in such floor panels, a relatively thick transparent component is usually required. When the relatively thick transparent component is provided with a lacquer and/or a relief in a manner know in the art, the result is a floor panel that does not have a fully natural appearance, especially when looked at from different angles and/or in different light conditions.

Document WO 2018/065859 relates to a floor panel which comprises a substrate and a top layer provided above, and preferably directly above, the substrate, wherein the top layer comprises a decor layer, a thermoplastic, transparent or translucent, wear layer, and a lacquer layer provided above the wear layer, and wherein the floor panel has an upper surface showing a relief, with the characteristic that the relief has a maximum relief depth which is larger than 100 microns, and that the wear layer and the lacquer layer are embossed in order to form the relief. As a result of the above features, glossy spots can be avoided.

Document EP 2 883 712 relates to a floor covering with at least a substrate layer, a decor layer and a transparent wear layer, wherein a relief is realized in the wear layer, wherein this relief comprises recesses, with the characteristic that the transparent wear layer comprises at least two lacquer layers, namely a first lacquer layer located at least on the bottom of one of said recesses, and a second lacquer layer which is interrupted at the location of the recess concerned. With the above features, structured parts with mutually differing gloss can be achieved.

While the documents above each may offer a solution to the problem of unnatural appearance of a floor panel due to gloss-related issues, it does not offer a solution to the problem of a floor panel not having a natural appearance when looked at from different angles and/or in different light conditions.

SUMMARY

The present invention primarily aims at an alternative floor panel providing a natural look. In particular, the invention strives at giving floor panels comprising thermoplastic synthetic material an improved natural look.

To this aim, the invention relates to a floor panel and a method as defined in the appended independent claims, wherein preferred embodiments are defined in the dependent claims.

According to a first aspect, the invention relates to a floor panel comprising a substrate, a decorative layer, and a transparent component. The decorative layer is positioned between the substrate and the transparent component. At least one of the substrate, the decorative layer and the transparent component comprises a thermoplastic synthetic material. The transparent component has an upper surface opposite the decorative layer. Preferably, the upper surface of the transparent component generally extends in an upper surface plane. The floor panel further comprises an enhancement component, the enhancement component being provided on the upper surface of the transparent component, a thickness of the enhancement component varying along a cross section of the floor panel.

By providing an enhancement component on the upper surface of the transparent component, which enhancement component does not have a uniform thickness over the floor panel, a more natural look may be achieved. The varying thickness of the enhancement component may influence the visual appearance of the enhancement component on the floor panel and give an improved natural look. By varying the thickness of the enhancement component along the cross section of the floor panel, a floor panel having a natural appearance when looked at from different angles and/or in different light conditions can be achieved.

The variation in thickness of the enhancement component can be attained in a number of ways, either separately or in combination. For example, the enhancement component may be provided on the upper surface of the transparent component in a discontinuous manner, so that the upper surface may comprise one or more covered regions, which are covered by the enhancement component, and one or more free regions, which are not covered by the enhancement component.

By providing the enhancement component on the upper surface in a discontinuous manner, an improved natural look may be achieved. In the free regions, the upper surface of the transparent component is visible, while in the covered regions, enhancement component material of preferably varying thickness covers the transparent component, giving the floor panel a natural appearance when looked at from different angles and/or in different light conditions. Also, the free regions can allow for improving the wear resistance and life span of the floor panels, as the transparent component may be adapted to be more wear resistant than the enhancement component.

In one embodiment, a relief may be realized in the upper surface of the transparent component, the relief comprising recesses, and the enhancement component may be provided in some, preferably a majority, more preferably all, of the recesses. Preferably, the relief thus extends from the upper surface plane of the transparent component towards the decorative layer.

By realizing a relief in the upper surface of the transparent component and providing the enhancement component in at least some of the recesses of the relief, a further improved natural look can be achieved. In addition, the relief provides a natural feel. The pattern of the relief, and thus the pattern of the enhancement component, may preferably be adapted to the print on the decorative layer, and they may be either in register with the print or not. By these features, the floor panel has a natural appearance even when looked at from different angles and/or in different light conditions.

The variation in thickness of the enhancement component can be attained by varying the amount of enhancement component in the recesses between different recesses and/or along a cross section of the floor panel. Preferably, the recesses have a depth measured from the upper surface plane of the transparent component, and the depth may vary along the cross section of the floor panel. In this manner, and to the extent that the enhancement component reaches the lowermost portion of at least some of the recesses, a shortest distance between the enhancement component and the decorative layer will vary along a cross section of the floor panel.

According to some embodiments, the depth of the recesses may vary within the interval of 1 μm to 1000 μm, preferably within the interval 150 μm to 600 μm. According to some embodiments, the depth of the recesses may also vary within the interval of 15 μm to 20 μm, wherein these recesses are preferably referred to as "microstructure".

According to some embodiments, recesses with a larger depth such as between 150 μm and 600 μm, and microstructure with a smaller depth such as between 15 μm and 20 μm may be present next to one another. Additionally and/or alternatively, recesses with a larger depth such as between 150 μm and 600 μm, and microstructure with a smaller depth such as between 15 μm and 20 μm may be superimposed onto one another, such that one or more regions of microstructure are present within one or more recesses, preferably along the inner surface of said recesses.

The enhancement component does not have to uniformly fill all of the recesses. Rather, the enhancement component may partly fill the one or more recesses in which it is provided.

By having the recesses only partly filled with enhancement component, the enhancement component is better protected against wear, thus improving the life span of the floor panel. Also, partly filling the recesses gives the floor panel an improved natural appearance, especially when looked at from different angles.

Alternatively, the enhancement component may completely fill the one or more recesses in which it is provided.

By having the recesses completely filled with enhancement component, a smoother surface is provided on the floor panel. Thereby, the floor panel may be easier to clean.

At least one of the covered regions may comprise a surface area having a greater roughness than an adjacent surface area. Preferably, said greater roughness is obtained by the presence of one or more regions of microstructure having a depth which may vary within the interval of 15 μm to 20 μm.

According to some embodiments, roughness is determined as the Arithmetical Mean Roughness as defined by the ISO 4287:1997 standard. Preferably, said surface area having a greater roughness may have a roughness of at least 1.5 μm Ra, by preference of at least 2.0 μm Ra, more by preference of at least 2.5 μm Ra.

According to some embodiments, recesses with a larger depth, such as between 150 μm and 600 μm, and microstructure with a smaller depth such as between 15 μm and 20 μm, may be present next to one another, wherein the relief is generally obtained by one or more recesses, and wherein a greater roughness is obtained by one or more regions of microstructure.

The enhancement component will more easily adhere to a surface area having a greater roughness. Also, in a surface area having a greater roughness the amount of enhancement component that is absorbed is higher and the enhancement component penetrates deeper into the transparent component. Thus, the visual appearance of the floor panel may be even further improved and made more natural. As an example, greyscale effects may be obtained.

The enhancement component may be a lacquer, a paint, or the like and may be opaque, semi-transparent, or fully transparent, depending on the desired appearance of the floor panel.

To ensure compatibility of the enhancement component to other materials of the floor panel, the enhancement component may be a water and/or solvent based product, for example a water-based UV curable product. Alternatively, the enhancement component may be an oil-based product.

For ease of application, the enhancement component may be a lacquer, preferably an acrylate lacquer, more preferably an energy curable acrylate lacquer, even more preferably a UV curable acrylate lacquer.

The enhancement component may be used as a carrier for additives which can impart particular properties to the floor panel. For example, the enhancement component may comprise one or more of the following: coloured pigments, dyes, metallic pigments, pearlescent pigments, matting agents, wear-resistant particles, dirt-repellent additives, easy-to-clean additives, mildew-repellent additives and anti-bacterial additives.

In a particular embodiment, the enhancement component may comprise wear-resistant particles. As a consequence, the transparent component, which typically serves as a wear layer, may be made thinner. For example, the transparent component may have a thickness of 0.2 mm or less, preferably 0.1 mm or less.

To protect the enhancement component from wear and/or staining, a sealer and/or a topcoat may be provided over the enhancement component.

The transparent component may comprise a wear layer and/or a primer layer and/or a topcoat layer, with at least one of the layers making up the transparent component comprising a thermoplastic synthetic material.

For improved compatibility between the layers making up the floor panel, in a particular embodiment each of the substrate, the decorative layer and the transparent component may comprise a thermoplastic synthetic material. A suitable thermoplastic synthetic material may be polyvinyl chloride, preferably soft polyvinyl chloride.

According to a second aspect, the invention relates to a method for manufacturing a floor panel, the method comprising the step of:
  a. preparing a semi-finished product comprising a substrate, a decorative layer and a transparent component, wherein the decorative layer is positioned between the substrate and the transparent component and wherein at least one of the substrate, the decorative layer and the transparent component comprises a thermoplastic synthetic material;
with the characteristic that the method further comprises the step of:
  b. applying an enhancement component to an upper surface of the transparent component, the upper surface being opposite the decorative layer, in a manner such that a thickness of the enhancement component varies along a cross section of the floor panel.

Preferably, the upper surface of the transparent component generally extends in an upper surface plane. By providing an enhancement component on the upper surface of the transparent component, which enhancement component does not have a uniform thickness over the floor panel, a more natural look is achieved. The varying thickness of the enhancement component influences the visual appearance of the enhancement component on the floor panel and gives an improved natural look. By varying the thickness of the enhancement component along the cross section of the floor panel, a floor panel having a natural appearance when looked at from different angles and/or in different light conditions is achieved.

Step b) may further comprise applying the enhancement component in a discontinuous manner, so that the upper surface comprises one or more covered regions, which are covered by the enhancement component, and one or more free regions, which are not covered by the enhancement component.

By providing the enhancement component on the upper surface in a discontinuous manner, an improved natural look is achieved. In the free regions, the upper surface of the transparent component is visible, while in the covered regions, enhancement component material of varying thickness covers the transparent component, giving the floor panel a natural appearance when looked at from different angles and/or in different light conditions. Also, the free regions allow for improving the wear resistance and life span of the floor panels, as the transparent component may be adapted to be more wear resistant than the enhancement component.

The method may further comprise the step of:
c. Embossing the semi-finished product, thereby forming a relief in the upper surface of the transparent component, the relief comprising recesses, and step b) may comprise providing the enhancement component in some, preferably a majority, more preferably all, of the recesses. Preferably, the relief thus extends from the upper surface plane of the transparent component towards the decorative layer.

By realizing a relief in the upper surface of the transparent component and providing the enhancement component in at least some of the recesses of the relief, a further improved natural look can be achieved. In addition, the relief provides a natural feel. The pattern of the relief, and thus the pattern of the enhancement component, may preferably be adapted to the print on the decorative layer, and they may be either in register with the print or not. By these features, the floor panel has a natural appearance even when looked at from different angles and/or in different light conditions.

Depending on its viscosity, the enhancement component may be applied by means of at least one roller and/or scraper. Alternatively, it may be applied by means of polishing and/or wiping the upper surface. The skilled person will appreciate that different visual effects and surface properties can be attained depending on which application method is selected.

The method may further comprise the step of:
d. after applying the enhancement component to an upper surface of the transparent component, mechanically treating the enhancement component, such as by brushing and/or grinding.

In this manner, either the entire surface, or selected regions thereof, may be treated so as to impart a particular effect.

Depending on the effect to be attained, the enhancement component may be applied so as to partially or completely fill the one or more recesses in which it is provided.

Each of the recesses will have a surface opening having an opening area and the enhancement component will have a viscosity, wherein the amount of enhancement component in each of the recesses may be controlled by adapting the opening area and/or the viscosity.

The amount of enhancement component in each of the recesses may be controlled or further controlled by evaporating at least part of the enhancement component by drying.

The method may further comprise the step of:
e. on the upper surface of the transparent component, creating at least one surface area having a greater roughness than an adjacent surface area;

and at least one of the covered regions may comprise the at least one surface area having the greater roughness.

The enhancement component will more easily adhere to a surface area having a greater roughness. Also, in a surface area having a greater roughness the amount of enhancement component that is absorbed is higher and the enhancement component penetrates deeper into the transparent component. Thus, the visual appearance of the floor panel may be even further improved and made more natural. As an example, greyscale effects may be obtained.

The transparent component may comprise a wear layer and/or a primer layer and/or a topcoat layer, with at least one of the layers making up the transparent component comprising a thermoplastic synthetic material.

The transparent component may comprise the wear layer and may further comprise the primer layer and/or the topcoat layer, and the method may further comprise the steps of:
f. partly curing the primer layer and/or topcoat layer before embossing the semi-finished product; and
g. fully curing the primer layer and/or topcoat layer after applying the enhancement component.

The above step of partly curing the primer layer and/or topcoat layer, and/or the step of fully curing these layers only after embossing, allows for embossing the relevant layer with minimized risk of creating defects. Moreover the structure of a press element will be more easily copied into the respective layer and to a fuller extent, i.e. all details provided on the press element will be transferred maximally to the respective layer to be embossed, while the semi-product is easily handled in production seeing the semi-cured constituents may be less liquid than in their uncured state.

The above step of fully curing the primer layer and/or topcoat layer only after application of the enhancement component allows for an enhanced adherence of the enhancement component. One or both of the primer layer or topcoat layer then function as a tie layer that adhere to the enhancement component.

The method may further comprise the step of:
h. applying a topcoat over the enhancement component.

The provision of a topcoat over the enhancement component can protect the enhancement component from wear or staining and/or may better secure the enhancement component to the product.

The method may further comprise the step of:
i. applying a sealer over the enhancement component before applying the topcoat or forming the topcoat.

The sealer may comprise wear-resistant particles, for example corundum, to thereby improve the service life of the floor panel.

It is envisaged that the sealer and topcoat may have different degrees of gloss. Preferably, the difference in gloss degree relates at least to a difference of 6 or still better 10 points as measured according to DIN 67530. Preferably, the difference is such that the one lacquer layer is perceived as matte, whereas the other is perceived as glossy.

For ease of application, the enhancement component may be a lacquer, a paint, or the like. The enhancement component is hence preferably liquidly applied.

The method may further include step c) being carried out using an embossing roller. The embossing roller may be a steel roller. If hot embossing is to be carried out, the steel roller may be heated to a temperature between 180° C. and 200° C.

The method may include using a counter pressure roller, preferably having a rubber, or a synthetic rubber, peripheral surface, together with the embossing roller.

In one embodiment, the embossing roller has a raised embossment, corresponding to the relief to be imparted into the transparent component, and regions devoid of the raised embossment. Step c) can then be carried out under pressure conditions such that regions devoid of the raised embossment will contact the upper surface of the transparent component. In this manner, the occurrence of shiny regions on the upper surface of the transparent component can be avoided, or at least mitigated.

The method may include, after step c) though prior to step b), the step of:
j) chemically and/or mechanically degreasing the upper surface of the transparent component.

In this manner, better adhesion of subsequent layers can be facilitated.

Particularly when relatively large amounts of enhancement component are to be applied to the upper surface of the transparent component, it may be advantageous if step b) is carried out in a plurality of separate application steps.

The method may include the step of mechanically treating the covered upper surface of the transparent component, for example by grinding and/or brushing, prior to applying the topcoat to the sealer.

BRIEF DESCRIPTION OF THE DRAWINGS

With the intention of better showing the characteristics of the invention, hereinafter, as an example without any limitative character, some preferred embodiments are described, with reference to the accompanying drawings, wherein.

DETAILED DESCRIPTION OF VARIOUS EMBODIMENTS

Figure 1:
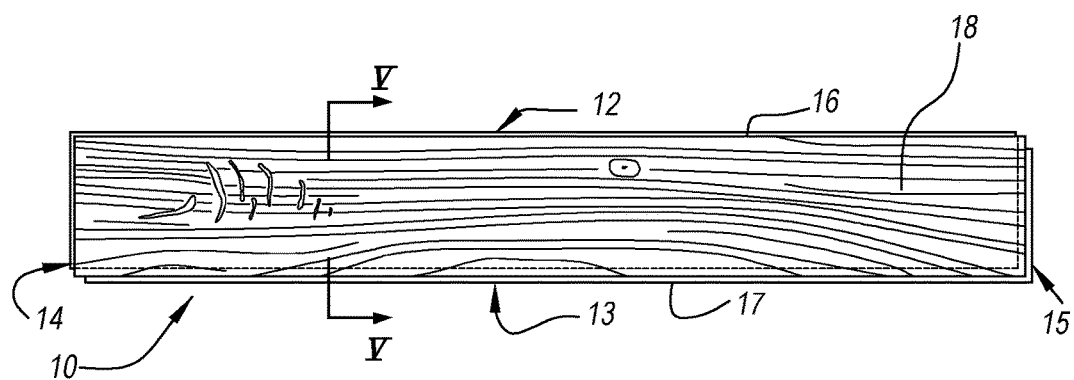
FIG. 1 represents a floor panel according to the invention.

In the drawings, reference number 10 generally denotes a floor panel in accordance with the present invention. The floor panel is generally rectangular and has a first pair of opposite sides 12, 13 and a second pair of opposite sides 14, 15. In FIG. 1, the first pair of opposite sides is longer than the second pair, though it is to be understood that the principles of the present invention are applicable to panels and tiles of any shape, including tiles having sides of the same length. Such tiles include square or polygonal shaped tiles.

In order that a plurality of floor panels may be laid to form a floating floor, each floor panel may be provided, at least at one pair of opposite sides 12-13, with integrated coupling parts 16-17 which allow effecting a mechanical coupling between adjacent such floor panels. An example of such coupling parts 16-17 will be described in greater detail with respect to FIG. 5. The floor panel 10 further comprises a top surface 18, which constitutes the surface of the floor panel 10 which is visible when the floor panel is installed on an underlying surface or subfloor.

Figure 2:
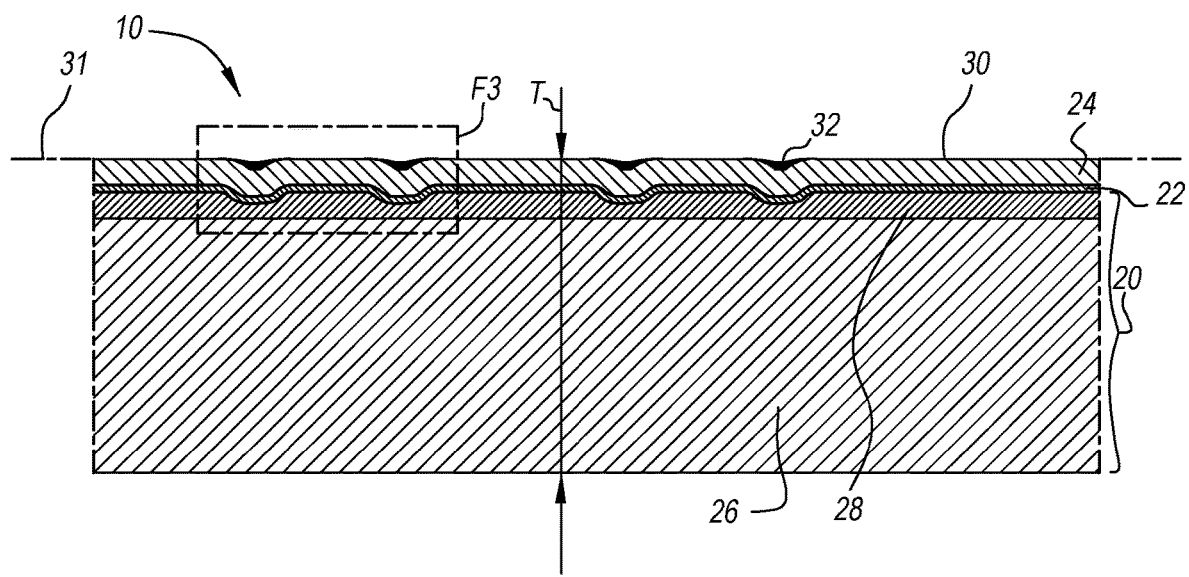
FIG. 2 represents a cross-section of the floor panel of the invention.

As may be gleaned from FIG. 2, the floor panel 10 of the present invention comprises a plurality of layers, including a substrate 20, a decorative layer 22 and a transparent component 24. At least one of these layers comprises a thermoplastic material. In the embodiment illustrated in FIG. 2, the substrate 20 optionally comprises a first substrate layer 26 and a second substrate layer 28. The first substrate layer 26 can be rigid, semi-rigid or flexible. The first substrate layer 26 may comprise a thermoplastic synthetic material, which may or may not be foamed. Purely as way of example, the first substrate layer 26 may comprise PVC, soft PVC, polypropylene or thermoplastic polyurethane. Alternatively, the first substrate layer 26 may relate to a wood-based layer of, for example, MDF or HDF. Preferably, the first substrate layer 26 constitutes a majority of the thickness T of the floor panel 10. Typically, a floor panel in accordance with the invention may have a thickness of from 3.0 mm to 12.0 mm.

The second substrate layer 28 serves as an embossing layer and is located underneath, and preferably directly underneath, the decorative layer 22. Advantageously, the embossing layer 28 comprises a material that is softer than the first substrate layer 26. This means that the floor panel 10 can be easily embossed in order to form a relief on the top surface 18. Furthermore, a relatively soft material imparts favourable sound absorption properties to the panel. Preferably, the embossing layer 28 is combined with a first substrate layer 26 thereunder which is more rigid than the embossing layer 28. Thus, in one embodiment, the first substrate layer 26 may be made of a rigid thermoplastic or a wood-based material, for example, MDF or HDF. The more rigid first substrate layer 26 can impart further advantages to the floor panel of the invention. For example, by providing the integrated coupling parts 16-17 in this layer, a strong mechanical coupling can be achieved. In addition, a more rigid material is less likely to transmit subfloor irregularities through the panel (so called "telegraphing"). Of course, it is to be understood that the substrate 20 may also include other layers in addition to the first and second substrate layers.

As is further illustrated in FIG. 2, the decorative layer 22 is positioned between the substrate 20 and the transparent component 24. Consequently, the transparent component 24 acts as a wear layer and protects the underlying decorative layer 22 from dirt and moisture. The decorative layer may be a, preferably flexible, thermoplastic film or foil, for example a soft PVC foil. It may be provided with a decor which preferably depicts a natural product, for example wood, stone, or ceramics. Preferably, the decor of the decorative layer 22 is printed or imprinted. This may be achieved by means of any of the following printing techniques: offset printing, gravure printing, or a digital printing technique, in which, for example, a digital printer or inkjet printer is applied. However, other printing techniques are not excluded. In a variant, the decor of the decorative layer 22 is imprinted or printed directly on the substrate 20, whereby the decor as such forms the decorative layer 22. However, it is not excluded that the decor is imprinted or printed on a primer present on the substrate 20.

In another variant, the decor of the decorative layer 22 is imprinted or printed on a lower surface of the transparent component 24. Here, too, the decor as such forms the decorative layer 22.

The transparent component 24 may comprise one or more layers. Each layer is transparent or translucent, so that the decor of the decorative layer 22 is visible through the transparent component 24. The maximum thickness of the transparent component may be less than 0.5 mm, preferably less than 0.2 mm, more preferably less than 0.1 mm. Preferably, the transparent component 24 serves as a wear layer. The wear layer may comprise a thermoplastic synthetic material, such as PVC or soft PVC. Preferably, the wear layer is directly above the decorative layer 22.

The transparent component 24 has an upper surface 30 opposite the decorative layer 22. The upper surface 30 of the transparent component 24 generally extends in an upper surface plane 31. When the floor panel 10 of the present invention is laid on a subfloor, the upper surface plane 31 will be substantially parallel to the surface of the subfloor. In accordance with the invention, the floor panel 10 further comprises an enhancement component 32. The enhancement component is provided on the upper surface 30 of the transparent component 24. As will be explained in relation to more detailed drawings below, the enhancement component 32 has a thickness $t_{ec}$ that varies along a cross section of the floor panel 10.

The enhancement component 32 may be a lacquer, a paint, a stain or the like, which may be water based, oil based or solvent based. In a variant, it is an acrylate lacquer, which may or may not be UV curable. The enhancement component 32 may be opaque, semi-transparent or fully transparent.

Preferably, the enhancement component 32, as applied on the transparent component 24, comprises areas where the enhancement component 32 has an opacity as expressed by a density number measured with a reflection densitometer of 0.8 or more. Preferably, the enhancement component 32, as applied on the transparent component 24, comprises at least two areas where the enhancement component 32 has a mutually different density number. Preferably, in a first area the density number is 1 or below 1, while in a second area the density number is above 1.

Preferably the enhancement component 32 is such that its density number can be altered by means of the thickness or the amount of enhancement component 32 applied. Preferably the density number may increase at least by 0.3, and preferably at least by 0.5 by changing the applied thickness from 10 µm to 200 µm.

In a variant, the enhancement component 32 may comprise one or more of the following: coloured pigments, dyes, organic particles, inorganic particles, metallic pigments, pearlescent pigments, matting agents, wear-resistant particles, dirt-repellent additives, easy-to-clean additives, mildew-repellent additives and anti-bacterial additives. The amount of pigments, dyes, particles, agents and/or additives determines the properties of the enhancement component 32. In a variant, the wear resistant particles may be abrasion resistant. Such particles preferably comprise a hard inorganic material and the diameter of the particles is preferably larger than 30 µm, more preferably larger than 100 µm, even more preferably up to 200 µm. In a further variant, the wear resistant particles may be scratch resistant particles, preferably comprising a hard inorganic material. The diameter of such particles is preferably less than 30 µm.

A particularly advantageous alternative is attained by using an enhancement component 32 comprising wear resistant particles when the transparent component 24 serves as a wear layer having a thickness that is less than 0.2 mm, or more particularly less than 0.1 mm, or no wear layer at all.

Figure 3A:
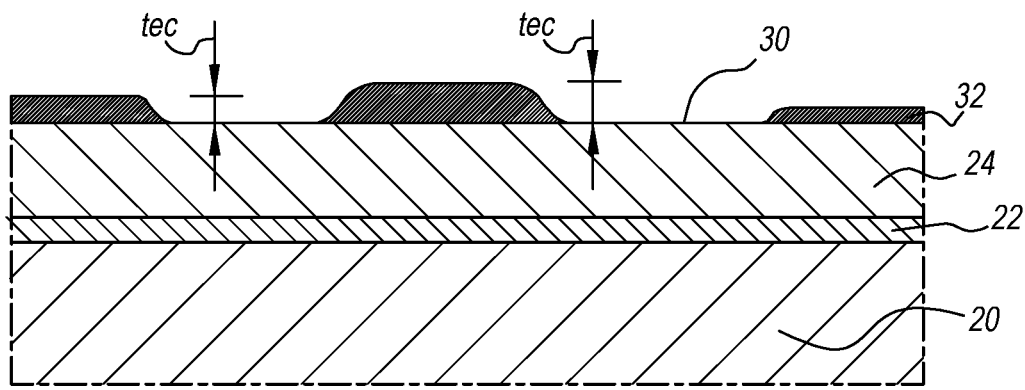
FIG. 3a-3e represent in an enlarged manner that which is indicated by F3 in FIG. 2.

In one embodiment of the invention, the upper surface 30 of the transparent component 24 comprises regions that are covered by the enhancement component 32 and regions that are not covered by the enhancement component. In other words, the enhancement component 32 is provided on the upper surface 30 of the transparent component 24 in a discontinuous manner. One such embodiment is illustrated in FIG. 3a. In contrast to some further embodiments of the invention, the upper surface 30 of the transparent component 24 is essentially smooth. The enhancement component 32 is provided on the upper surface of the transparent component in such a way that the thickness $t_{ec}$ of the enhancement component varies along a cross section of the floor panel 10.

Figure 3B:
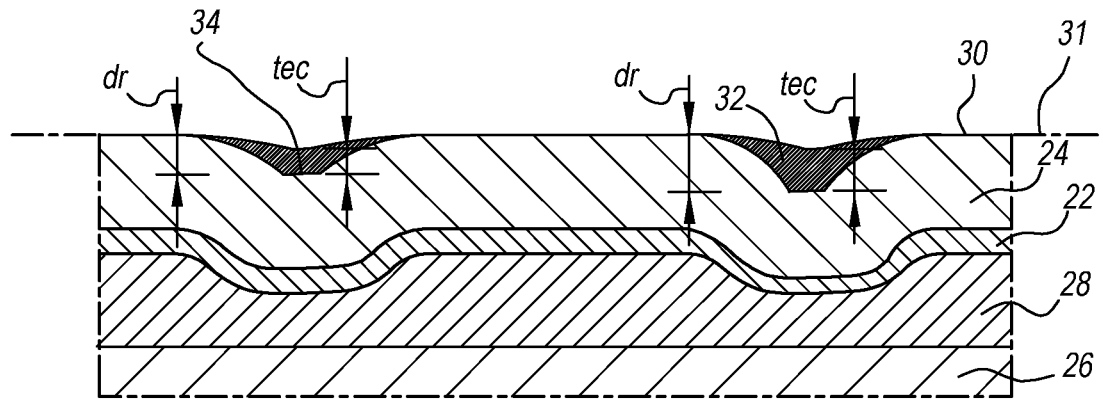

Another exemplary embodiment of the invention is shown in FIG. 3b. In this embodiment, a relief, comprising recesses 34 having a depth $d_r$ as measured from the upper surface plane 31 of the transparent component, is realized in the upper surface 30 of the transparent component 24. The recesses 34 are used to simulate the texture of a natural product, for example a wood texture. Preferably, although not necessarily, the recesses 34 are in register with the decor of the decorative layer 22. The depth $d_r$ of the recesses 34 may vary along a cross section of the floor panel 10. The depth $d_r$ may vary within the interval 1 µm to 1000 µm, preferably within the interval 150 µm to 600 µm.

As can be seen in FIG. 3b, the enhancement component 32 is provided in at least some of the recesses 34. The amount of enhancement component 32 may vary between different recesses 34. Variation in the amount may be achieved by providing recesses 34 of different volume. The volume may vary due to differences in depth and/or width and/or length. In FIG. 3b the depth $d_r$ of the recesses 34 varies along a cross section of the floor panel 10. The enhancement component 32 essentially completely fills the recesses 34 in which it is provided so that, depending on its viscosity during its application to the upper surface 30 of the transparent component 24, the thickness $t_{ec}$ of the enhancement component 32 will tend to correspond to the depth $d_r$ of the recesses 34. Since the depth d r of the recesses 34 varies, then so too will the thickness $t_{ec}$ of the enhancement component 32. Additionally, since the recesses 34 have varying volume, the amount of enhancement component 32 will vary between different recesses 34. Preferably, the enhancement component 32 is provided in a majority of the recesses 34, and in a most preferred embodiment essentially all the recesses 34 include some enhancement component 32.

As may also be gleaned from FIG. 3b, the substrate of the floor panel 10 comprises an embossing layer 28 directly beneath the decorative layer 22. Since the embossing layer 28 is relatively soft and the decorative layer 22 is flexible, pressure which arises when the recesses 34 are formed will cause the decorative layer 22 and the embossing layer 28 to plastically deform. As a consequence, the thickness of the transparent component 24 remains substantially constant.

Figure 3C:
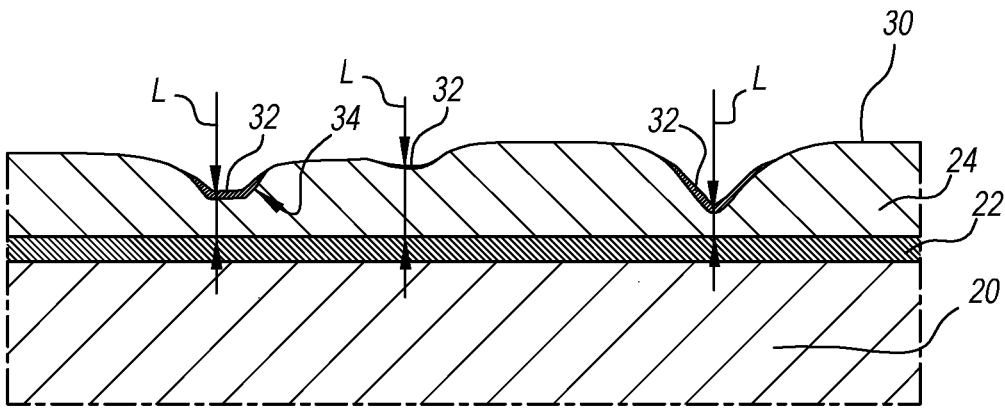

A further exemplary embodiment is shown in FIG. 3c. As with the second exemplary embodiment, a relief comprising recesses 34 is realized in the upper surface 30 of the transparent component 24, and the enhancement component 32 is provided in at least some of the recesses 34. In contrast to the FIG. 3b embodiment, the enhancement component 32 only partly fills the recesses 34 in which it is provided.

Furthermore, the substrate 20 does not comprise an embossing layer 28. In order to impart the necessary stability to the floor panel 10, the substrate 20 is relatively rigid. Consequently, the relief in the form of recesses 34 in the upper surface 30 of the transparent component 24 will not be facsimiled into the substrate 20. Furthermore, since the substrate 20 is relatively rigid, the decorative layer 22 will remain substantially flat on the upper surface of the substrate 20.

In FIG. 3c the recesses 34 are shown as having different depths. Since the depths of the recesses 34 vary, and the decorative layer 22 is substantially flat, a shortest distance L between the enhancement component 32 in each recess and the decorative layer 22 will vary along a cross section of the floor panel 10.

Figure 3D:
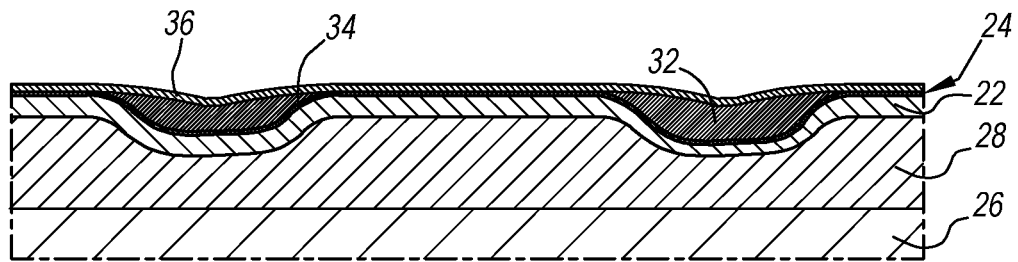

A further exemplary embodiment is shown in FIG. 3d. In this embodiment, the floor panel 10 comprises a first substrate layer 26, an embossing layer 28, a decorative layer 22, a transparent component 24 and an enhancement component 32. In contrast to the previously described embodiments, the transparent component 24 of the FIG. 3d embodiment is in the form of a primer layer and/or topcoat layer directly covering the decorative layer 22. The primer layer and/or the topcoat layer may comprise a transparent lacquer, for example an acrylate primer which may or may not be UV curable. Preferably, the primer layer is underneath the enhancement component 32, more preferably directly underneath. The primer may be an acrylate primer, which may or may not be UV curable. Recesses 34 are formed in the upper surface 30 of the floor panel 10 by deforming the embossing layer 28 and the decorative layer 22, and the transparent component 24 follows the thus deformed surface of the decorative layer 22. The enhancement component 32 is provided in the recesses 34. In this embodiment, the transparent component 24 is not intended to serve as a wear layer. Instead, the enhancement component 32 may comprise abrasion resistant particles. The enhancement component 32 may be covered by a sealer 36. Preferably, the sealer 36 comprises scratch resistant particles. The thickness of the primer layer, the topcoat layer and/or the sealer may be 5 μm to 25 μm.

In a variant, at least one of the topcoat layer of the transparent component 24, the sealer 36, the topcoat and the enhancement component 32 has a degree of gloss that is different from the degree of gloss of at least one of the others. Preferably, the difference in gloss degree relates at least to a difference of 6 or still better 10 points as measured according to DIN 67530. Preferably, the difference is such that at least one of the topcoat layer of the transparent component 24, the sealer 36, the topcoat and the enhancement component 32 is perceived as matte, whereas at least one of the others is perceived as glossy.

Figure 3E:
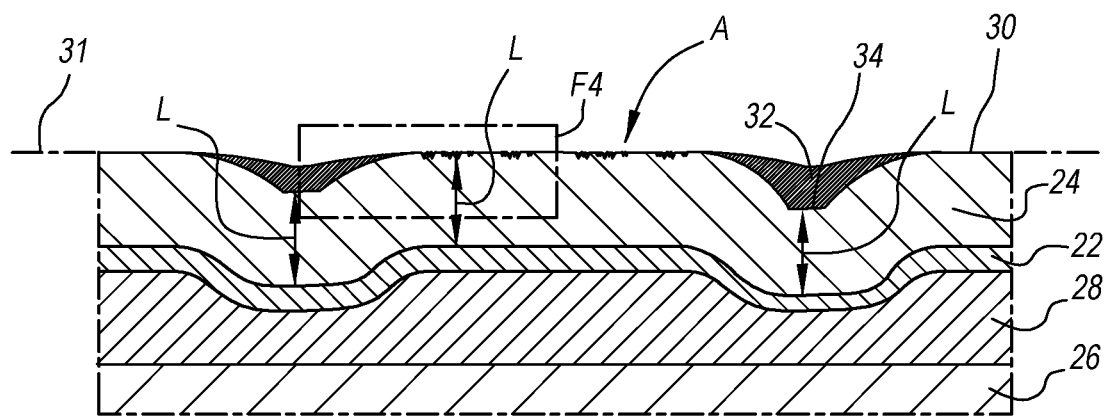
Figure 4A:
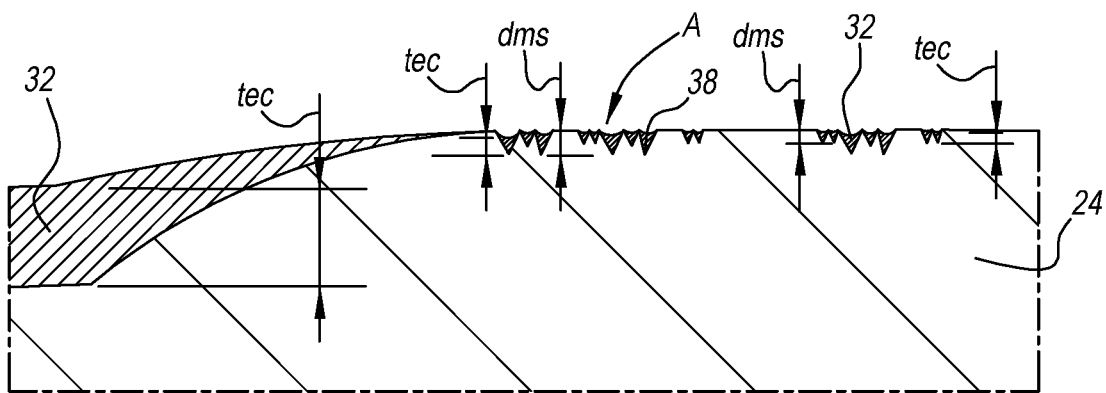
FIG. 4a-4b represent in an enlarged manner that which is indicated by F4 in FIG. 3e.

Yet another exemplary embodiment is shown in FIGS. 3e and 4a. In this embodiment, the floor panel 10 comprises a first substrate layer 26, an embossing layer 28, a decorative layer 22, a transparent component 24 and an enhancement component 32. In this embodiment the transparent component 24 may serve as a wear layer. A relief, comprising recesses 34, is realized in the upper surface 30 of the transparent component 24. Also, the upper surface 30 of the transparent component 24 comprises a surface area A provided with a microstructure 38, and thus has a greater roughness than adjacent areas of the upper surface 30. The microstructures 38 can be of varying depth $d_{ms}$. The depth $d_{ms}$ of the microstructure 38 may vary along a cross section of the floor panel Typically, the depth $d_{ms}$ may vary within the interval 15 μm to 20 μm. The surface area A having a greater roughness may or may not comprise one or more recesses 34. If the surface area A having a greater roughness comprises recesses 34, the microstructure 38 may be provided outside of and/or within the recesses 34.

The enhancement component 32 may be provided both in the recesses 34 and in the microstructure 38. The thickness $t_{ec}$ of the enhancement component 32 and the shortest distance L between the enhancement component 32 and the decorative layer 22 will vary along a cross section of the floor panel 10. Preferably, but not necessarily, the enhancement component 32 is provided in a major part of the microstructure 38 of the surface area A having a greater roughness. More preferably, the enhancement component 32 is provided in the entire microstructure 38. The thickness $t_{ec}$ of the enhancement component 32 may vary within the interval 1 μm to 600 μm, preferably within the interval 50 μm to 600 μm, more preferably within the interval 50 μm to 100 μm.

Figure 4B:
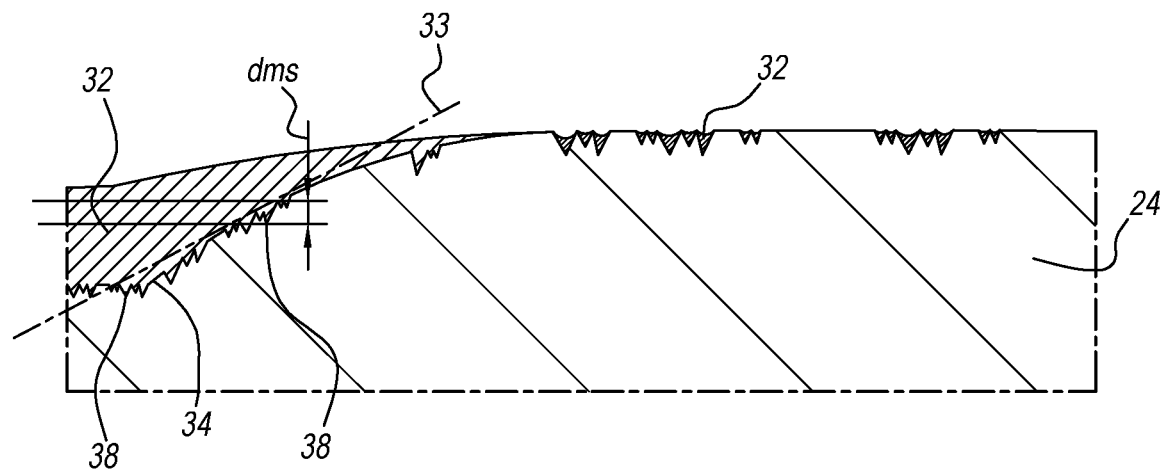

A further exemplary embodiment is shown in FIG. 4b. This embodiment is similar to that in FIG. 4a, but here the microstructure 38 is also provided in the recesses 34. In this embodiment, said microstructure 38 has a depth $d_{ms}$ as measured in a vertical direction from the local tangent surface plane 33 along the inner surface of the recess 34.

Figure 5:
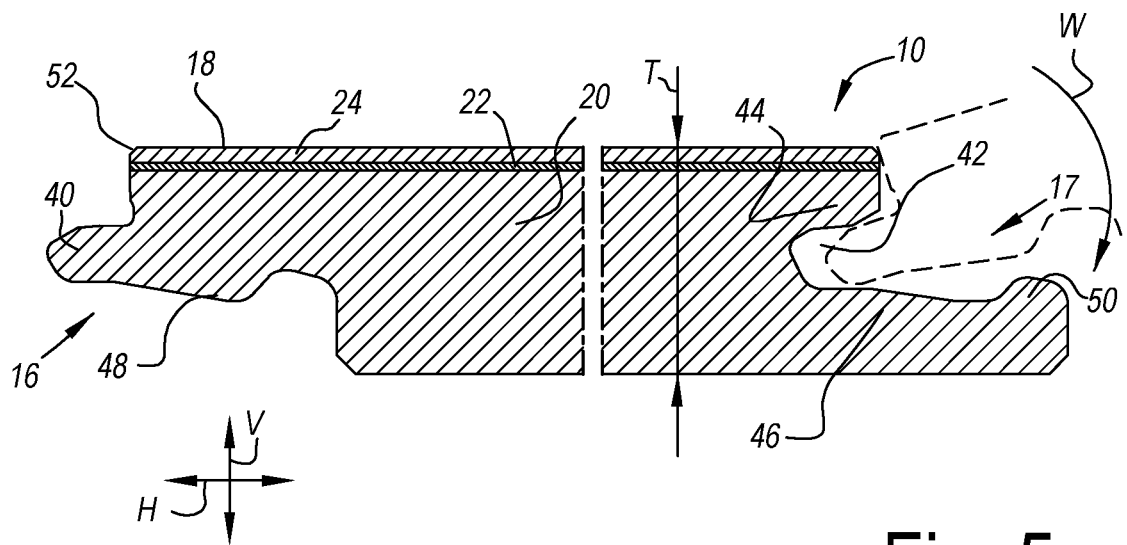
FIG. 5 represents a simplified cross-section along line V-V in FIG. 1.

As is alluded to above, FIG. 5 illustrates a floor panel 10 according to the invention which is further provided with coupling parts 16-17. The coupling parts 16-17 allow effecting a locking between two of such floor panels in the vertical direction V and in the horizontal direction H perpendicular to the coupled sides. The illustrated coupling parts 16-17 are of the type allowing two such floor panels 10 to be coupled together by means of a turning movement W. Here, this relates to a particular type of coupling parts in that they also allow coupling of the floor panels 10 by means of a substantially horizontal movement of the floor panels 10 with respect to each other, with the performance of a snap action. This last-mentioned manner of coupling is not represented.

The coupling parts 16-17 may be in the form of a tongue 40 and a groove 42, wherein the groove 42 is bordered by an upper lip 44 and a longer lower lip 46. Complementary locking elements 48, 50 are provided which counteract or even prevent the moving apart of the tongue 40 and the groove 42 in the horizontal direction H. The locking element 48 is in the form of a protrusion on a lower surface of the tongue 40. The protrusion is adapted to interact with a locking surface of the locking element 50 on the longer lower lip 46.

The coupling parts 16-17 are substantially, and here even entirely, manufactured in one piece with and from the material of the floor panel 10. Nevertheless, it is to be understood that the coupling parts 16-17 may instead be provided as separate parts that are connected in an integral manner to the floor panel 10.

Of course, other types of coupling parts can be utilized. For example, coupling parts which allow coupling solely by means of a turning movement may be provided. Still another type is so-called "push-lock" coupling parts, which allow coupling of the floor panels by means of a downward and substantially vertical movement.

It is not excluded that the second pair of opposite sides 14-15 are also provided with integrated mechanical coupling parts. These can be of the same type as the coupling parts on the first pair of opposite sides, though this is not necessarily the case. A particular embodiment is one wherein on a long pair of sides turning coupling parts are applied, whereas on a short pair of sides push-lock coupling parts are applied. In this manner, as two floor panels 10 are being joined by turning along adjacent long sides, the short side of the panel being turned will engage with a push-lock coupling part on a short side of a third panel 10.

The top surface 18 of the floor panel 10 depicted in FIG. 5 is provided with a bevel 52, typically along at least the first pair of opposite sides 12-13. It should be noted that the bevels 52 do not form part of the relief, considering that they are primarily provided to simulate a plank effect rather than a natural texture. Thus, the depth of the bevel 52 should not be considered when determining the depth $d_r$ of the recesses 34. However, the bevelled surface may be provided with an enhancement component as well, which shows the features of the invention and/or its preferred embodiments, with this understanding that in such case thicknesses and depths are measured perpendicularly to the bevelled surface.

Although not illustrated in the drawings, the substrate 20 of the floor panel 10 may comprise one or more reinforcement layers. The reinforcement layer is preferably composed of reinforcing fibres, such as glass fibres. The reinforcement layer may be in the form of a nonwoven or knitted glass fibre cloth or open net.

The floor panel 10 of the present invention may also be provided with a backing layer on the surface of the panel opposite to the top surface 18. The backing layer may serve as a balancing layer to mitigate warping of the floor panel. Depending on the material of the backing layer, it can also provide other effects, such as sound damping. One useful material for the backing layer is cork. Another is a thermoplastic material. This material may provide a flexible or semi-rigid backing layer in order to improve sound damping. However, in an alternative embodiment it may provide a rigid backing in order to improve the resistance of the floor panel 10 to telegraphing.

Figure 6:
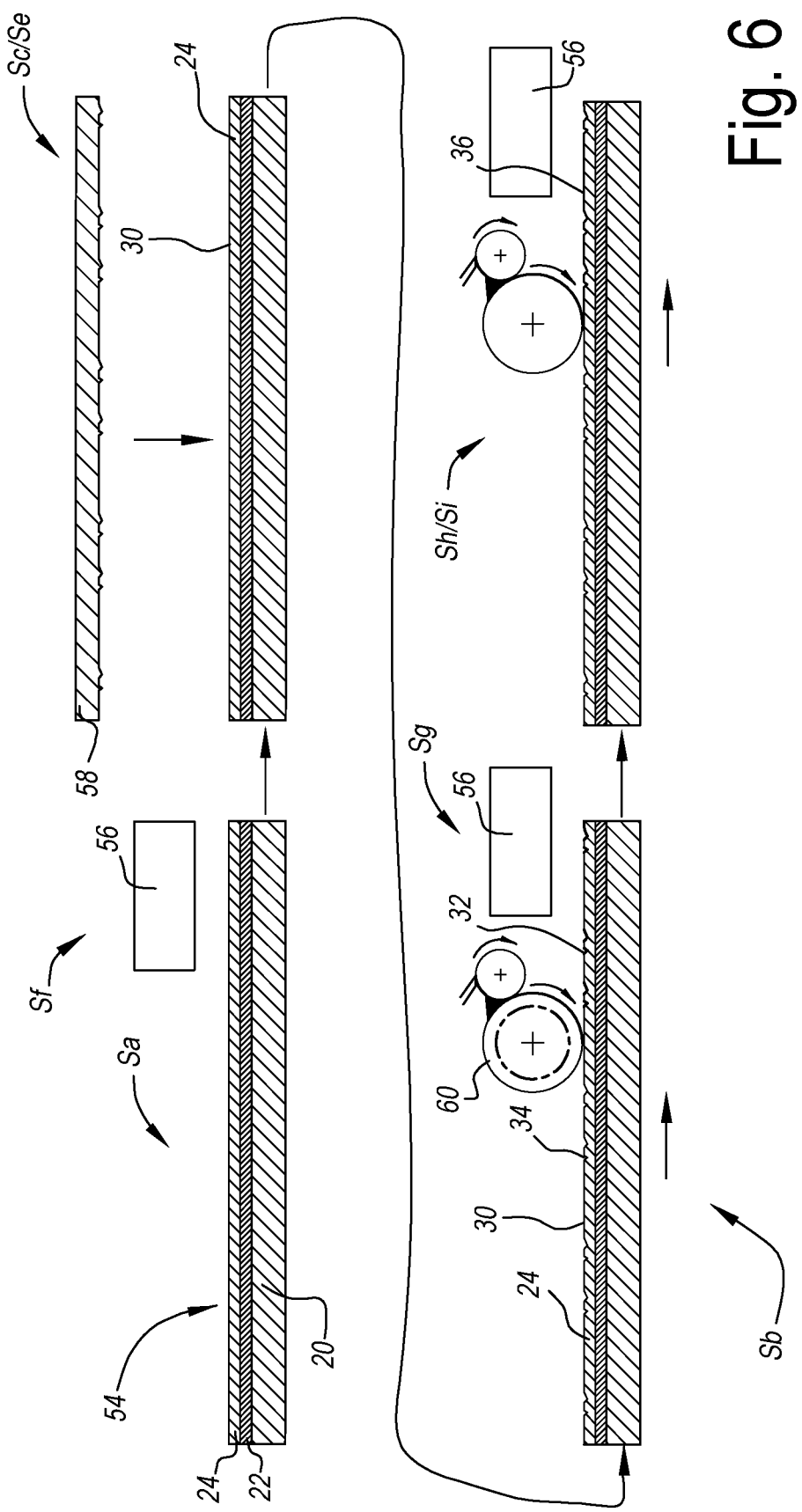
FIG. 6 represents a method according to the invention which can be applied for manufacturing the floor panel of the invention.

A further aspect of the invention relates to a method for manufacturing a floor panel 10 having the features laid out in the claims. Such a method is schematically illustrated in FIG. 6.

In a first step, referred to as step a) Sa, a semi-finished product 54 is prepared. The semi-finished product 54 comprises a substrate 20, a decorative layer 22 and a transparent component 24. Although the production of the semi-finished product 54 or the layers that it comprises is not illustrated, it will be understood that any suitable techniques, such as a strewing, extrusion and/or calendering, may be used to this aim.

In one embodiment, the method comprises an optional step, referred to as step f) Sf. In this embodiment, the transparent component 24 comprises a primer layer and/or a topcoat layer, which is partly cured or pre-cured in step f) Sf. To this aim, one or more UV lamps 56 may be employed, though other curing means are not excluded.

The method may comprise a different optional step, referred to as step c) Sc, in which the semi-finished product 54 is embossed, thereby forming a relief in the upper surface 30 of the transparent component 24. The embossing may be performed by means of a mechanical embossing technique, using a structured element 58. The structured element 58 comprises a structure for creating the recesses 34 of the relief. The structured element 58 may be, for example, a press plate or a roller. In a continuous production process, it may be advantageous to use an embossing roller as the structured element 58, with the embossing roller having a raised embossment corresponding to the relief to be imparted into the transparent component. Optionally, the embossing roller may be a steel roller. The steel roller may be heated, for example to between 180° C. and 200° C., so that hot embossment is achieved. It may be beneficial to make use of a counter pressure roller, for example a counter pressure roller having a rubber, or synthetic rubber, peripheral surface. By using a counter pressure roller, it can be ensured that the embossing roller exerts sufficient pressure such that regions of the embossing roller that are not provided with a raised embossment will contact the upper surface 30 of the transparent component 24 that lies essentially in the upper surface plane 31. In this manner, the occurrence of shiny regions on the upper surface of the transparent component can be avoided, or at least mitigated.

Optionally, the method comprises an optional step referred to as step e) Se, in which a surface area A having a greater roughness than an adjacent surface area is created on the upper surface 30 of the transparent component 24. To this aim, a structured element 58 is used. The structured element 58 comprises a structure for creating the microstructure 38 by means of which the greater surface roughness is achieved. Again, the structured element 58 may be, for example, a press element or a roller, particularly a roller of the type described above.

Preferably, step c) Sc and step e) Se may be carried out simultaneously. In a preferred embodiment, the structured element 58 comprises both the structure for creating the recesses 34 and the structure for creating the microstructure 38 in one pressing operation. Alternatively, they may be carried out separately, either by first creating the recesses 34 and then creating the microstructure 38, or by first creating the microstructure 38 and thereafter creating the recesses 34.

The method further comprises step b) Sb, in which the enhancement component 32 is applied to the upper surface 30 of the transparent component 24. In a variant, the enhancement component 32 may be applied by means of a roller 60, which may be made of rubber or any other suitable material. Other, non-limiting, options for applying the enhancement component 32 may be by means of a blade or a scraper, as well as by means of polishing and/or wiping the upper surface 30 of the transparent component 24.

In step b) Sb, the enhancement component 32 may be applied in a discontinuous manner so that the upper surface 30 of the transparent component 24 comprises one or more covered regions, which are covered by the enhancement component 32, and one or more free regions which are not covered by the enhancement component 32.

In the method in which step c) Sc is carried out prior to step b) Sb, the enhancement component 32 may be applied in step b) Sb so as to be provided in some, preferably a majority, more preferably all, of the recesses 34.

Similarly, in the method in which step e) Se is carried out prior to step b) Sb, the enhancement component 32 may be provided in step b) Sb on the at least one surface area A having a greater roughness. Preferably, but not necessarily, the enhancement component 32 is provided in a major part of the microstructure 38 of the surface area A having a greater roughness. More preferably, the enhancement component 32 is provided in the entire microstructure 38.

In step b) Sb, the enhancement component 32 may be applied such that where the enhancement component 32 is provided it may fill any recesses 34 and/or microstructure 38 partly or essentially fully. Each of the recesses 34 has a surface opening having an opening area, and the enhancement component 32 has a viscosity at the time it is applied. The amount of enhancement component 32 in each recess 34 can be controlled by adapting the opening area and/or viscosity. In a variant, the amount of enhancement component 32 may be controlled or further controlled by evaporating at least part of the enhancement component 32 by drying.

If the method comprises step f) Sf, it may also preferably comprise step g) Sg. In step g) Sg, the primer layer and/or topcoat layer, which after step b) Sb are at least partly covered by the enhancement component 32, are fully cured. To this aim, one or more UV lamps 56 may be employed, though other curing means are not excluded.

In one embodiment, the method comprises the optional step referred to as step d) Sd. This step is not explicitly represented in the drawing. In step d) Sd, the enhancement component 32 is mechanically treated, such as by grinding and/or brushing. Such a step will be described subsequently in connection with FIG. 7.

In one embodiment, the method comprises the optional step referred to as step i) Si. In this step, a sealer 36 is applied over the enhancement component 32. For this, rollers or other suitable means may be used. After application of the sealer, it may optionally be cured by means of heat and/or irradiation and/or (forced) drying. The sealer 36 may comprise wear-resistant particles such as corundum.

In one embodiment, the method comprises the optional step referred to as step h) Sh. In this step, a topcoat is applied over the enhancement component 32 and/or over the sealer 36. For this, rollers or other suitable means may be used. After application of the topcoat, it may optionally be cured by means of heat and/or irradiation and/or (forced) drying.

Figure 7:
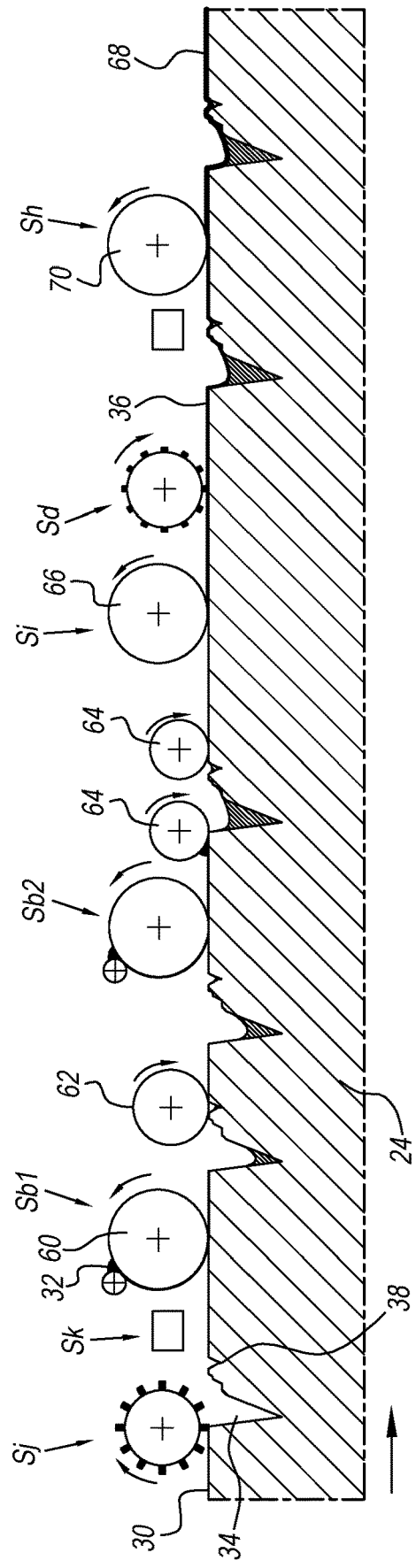
FIG. 7 represents a method of applying an enhancement component to the upper surface of a transparent component of a floor panel.

A variant of the above method is schematically illustrated in FIG. 7. For the sake of clarity, FIG. 7 shows the transparent component 24 of a semi-finished product after it has been embossed by the structured element 58 described above in relation to FIG. 6. Before applying the enhancement component, the upper surface 30 of the transparent component 24 may be chemically and/or mechanically degreased to thereby improve the adhesion of subsequent components to the upper surface. This degreasing step is labelled step j) Sj. The upper surface 30 of the transparent component may then be dried in a drying step k) Sk. The drying may be through natural or forced convection. The enhancement component 32 or, more particularly, at least some of the enhancement component is then applied in a first application step b) Sb1. As is explained above in relation to FIG. 6, the enhancement component 32 may be applied by means of a roller 60, which may be made of rubber or any other suitable material. Other, non-limiting, options for applying the enhancement component 32 may be by means of a blade or a scraper, as well as by means of polishing and/or wiping the upper surface 30 of the transparent component 24. To ensure that the enhancement component adequately fills any microstructure 38, it may be advantageous to subsequently subject the upper surface 30 of the transparent component to a rolling operation, for example performed by one or more steel rollers 62.

Particularly when the relief in the upper surface of the transparent component comprises relatively deep recesses 34, it may be advantageous to apply the enhancement component in a plurality of application steps. Thus, and as is indicated by reference sign Sb2, the method of the invention may include a second application step b) Sb2. Identical or similar equipment to that used in the first application step b) Sb1 may be used for the second application step b) Sb2. Depending i.a. on the quantity of enhancement component 32 that is to be applied to the upper surface of the transparent component, it is of course conceivable that more than two application steps be provided. To ensure an even distribution of the applied quantity of enhancement component 32, the upper surface 30 of the transparent component 24 may optionally be subjected to one or more rolling operations downstream of the second application step b) Sb2. The rolling operation(s) may be carried out by one or more rollers denoted by reference number 64 in FIG. 7. The roller(s) 64 may be of steel or rubber.

Once the intended quantity of enhancement component has been applied to the upper surface of the transparent component, a sealer 36 may be applied in step i) Si. For this, one or more rollers 66 or other suitable means may be used. The sealer may include wear-resistant particles, for example of corundum, to thereby improve the service life of the floor panel. After application of the sealer, the thus covered upper surface of the transparent component may be mechanically treated, such as by grinding and/or brushing, in step d) Sd.

Finally, a topcoat 68 may be applied over the sealer 36. This step is labelled step h) Sh in the drawings and rollers 70 or other suitable means may be used to apply the topcoat 68. After application of the topcoat, it may optionally be cured by means of heat and/or irradiation and/or (forced) drying.

The thus-produced laminate may subsequently be cut and/or machined to create floor panels in accordance with the present invention.

Preferred embodiments and variants of the invention are defined in the following numbered items:

1. A floor panel 10 comprising a substrate 20, a decorative layer 22 and a transparent component 24, said decorative layer 22 being positioned between the substrate 20 and the transparent component 24, wherein at least one of the substrate 20, the decorative layer 22 and the transparent component 24 comprises a thermoplastic synthetic material, the transparent component 24 having an upper surface 30 opposite the decorative layer 22, wherein the floor panel 10 further comprises an enhancement component 32, said enhancement component 32 being provided on the upper surface 30 of the transparent component 24, and wherein a thickness $t_{ec}$ of the enhancement component 32 varies along a cross section of the floor panel 10.
2. The floor panel 10 according to item 1, wherein said enhancement component 32 is provided on the upper surface 30 of the transparent component 24 in a discontinuous manner, so that said upper surface 30 comprises one or more covered regions, which are covered by the enhancement component 32, and one or more free regions, which are not covered by the enhancement component 32.
3. The floor panel 10 according to item 1 or 2, wherein a relief is realized in the upper surface 30 of the transparent component 24, said relief comprising recesses 34 and wherein the enhancement component 32 is provided in some, preferably a majority, more preferably all, of the recesses 34.
4. Floor panel 10 according to item 3, wherein the amount of enhancement component 32 in the recesses 34 varies between different recesses 34 and/or along a cross section of the floor panel 10.
5. The floor panel 10 according to item 3 or 4, wherein said recesses 34 have a depth $d_r$ and wherein said depth $d_r$ varies along the cross section of the floor panel 10.
6. The floor panel 10 according to any of items 3 to 5, wherein a shortest distance L between the enhancement component 32 and the decorative layer 22 varies along a cross section of the floor panel 10.

7. The floor panel 10 according to any of items 3 to 6, wherein said enhancement component 32 partly fills the one or more recesses 34 in which it is provided.
8. The floor panel 10 according to any of items 3 to 6, wherein said enhancement component 32 essentially completely fills the one or more recesses 34 in which it is provided.
9. The floor panel 10 according to any of items 2 to 8, wherein at least one of said covered regions comprises a surface area A having a greater roughness than an adjacent surface area.
10. The floor panel 10 according to any of the preceding items, wherein said enhancement component 32 is a lacquer, a paint or the like.
11. The floor panel 10 according to item 10, wherein said enhancement component 32 is opaque.
12. The floor panel 10 according to item 10, wherein said enhancement component 32 is semi-transparent.
13. The floor panel 10 according to item 10, wherein said enhancement component 32 is fully transparent.
14. The floor panel 10 according to any of items 10 to 13, wherein said enhancement component 32 is a water and/or solvent based product.
15. The floor panel 10 according to any of items 10 to 14, wherein said enhancement component 32 is a water based UV curable product.
16. The floor panel 10 according to any of items 10 to 13, wherein said enhancement component 32 is an oil based product.
17. The floor panel 10 according to any of items 10 to 12, wherein said enhancement component 32 is a lacquer, preferably an acrylate lacquer, more preferably an energy curable acrylate lacquer, even more preferably a UV curable acrylate lacquer.
18. The floor panel 10 according to any of items 10 to 17, wherein said enhancement component 32 comprises one or more of the following: coloured pigments, dyes, metallic pigments, pearlescent pigments, matting agents, wear-resistant particles, dirt-repellent additives, easy-to-clean additives, mildew-repellent additives and anti-bacterial additives.
19. The floor panel 10 according to item 18, wherein said enhancement component 32 comprises wear-resistant particles and wherein said transparent component 24 has a thickness of 0.2 mm or less, preferably 0.1 mm or less.
20. The floor panel 10 according to any of the preceding items, wherein a sealer 36 and/or a topcoat is provided over the enhancement component.
21. The floor panel 10 according to any of the preceding items, wherein said transparent component 24 comprises a wear layer and/or a primer layer and/or a topcoat layer, wherein at least one of the layers making up the transparent component 24 comprises a thermoplastic synthetic material.
22. The floor panel 10 according to any of the preceding items, wherein the substrate 20, the decorative layer 22 and the transparent component 24 comprise a thermoplastic synthetic material.
23. The floor panel 10 according to any of the preceding items, wherein said thermoplastic synthetic material is polyvinyl chloride, preferably soft polyvinyl chloride.
24. A floor panel comprising a substrate 20, a decorative layer 22 and a transparent component 24, said decorative layer 22 being positioned between the substrate 20 and the transparent component 24, wherein at least one of the substrate 20, the decorative layer 22 and the transparent component 24 comprises a thermoplastic synthetic material, the transparent component 24 having an upper surface 30 opposite the decorative layer 22, wherein the floor panel 10 further comprises an enhancement component 32, wherein said enhancement component 32 is provided on the upper surface 30 of the transparent component 24 in a discontinuous manner, so that said upper surface 30 comprises one or more covered regions, which are covered by the enhancement component 32, and one or more free regions, which are not covered by the enhancement component 32, wherein at least one of said covered regions comprises a surface area A provided with a microstructure 38 and thus having a greater roughness than an adjacent surface area, wherein the enhancement component 32 is provided in the entire microstructure 38, and in that a thickness $t_{ec}$ of the enhancement component 32 varies within the interval 1 μm to 600 μm along a cross section of the floor panel 10.
25. A floor panel 10 comprising a substrate 20, a decorative layer 22 and a transparent component 24, said decorative layer 22 being positioned between the substrate 20 and the transparent component 24, wherein at least one of the substrate 20, the decorative layer 22 and the transparent component 24 comprises a thermoplastic synthetic material, the transparent component 24 having an upper surface 30 opposite the decorative layer 22, wherein the floor panel 10 further comprises an enhancement component 32, wherein said enhancement component 32 is provided on the upper surface 30 of the transparent component 24, the upper surface 30 of the transparent component having a relief, wherein a majority by volume of the enhancement component provided on the upper surface of the transparent component is accommodated within said relief.
26. The floor panel 10 according to item 25, wherein said relief is in the form of recesses 34 of varying depth The invention is not limited to the embodiments shown in the drawings and described hereinbefore but may be varied in different manners within the scope of the appended claims.

The invention claimed is:

1. A floor panel comprising a substrate, a decorative layer and a transparent component, said decorative layer being positioned between the substrate and the transparent component,
wherein at least one of the substrate, the decorative layer and the transparent component comprises a thermoplastic synthetic material, the transparent component having an upper surface opposite the decorative layer,
wherein the floor panel further comprises an enhancement component, said enhancement component being provided on the upper surface of the transparent component, and in that a thickness of the enhancement component varies along a cross section of the floor panel;
wherein said enhancement component is a lacquer or paint;
wherein said enhancement component is semi-transparent or opaque;
wherein said enhancement component comprises at least two areas having mutually different opacities, wherein each of the opacities is expressed by a density number measured with a reflection densitometer.

2. The floor panel of claim 1, wherein said enhancement component is provided on the upper surface of the transparent component in a discontinuous manner, so that said upper surface comprises one or more covered regions, which are covered by the enhancement component, and one or more free regions, which are not covered by the enhancement component.

3. The floor panel of claim 1, wherein a relief is realized in the upper surface of the transparent component, said relief comprising recesses and wherein the enhancement component is provided in some of the recesses.

4. The floor panel of claim 3, wherein an amount of enhancement component in the recesses varies between different recesses and/or along a cross section of the floor panel.

5. The floor panel of claim 3, wherein said recesses have a depth and wherein said depth varies along the cross section of the floor panel.

6. The floor panel of claim 3, wherein a shortest distance between the enhancement component and the decorative layer varies along a cross section of the floor panel.

7. The floor panel of claim 3, wherein said enhancement component partly fills the one or more recesses in which it is provided.

8. The floor panel of claim 3, wherein said enhancement component essentially completely fills the one or more recesses in which it is provided.

9. The floor panel of claim 2, wherein at least one of said covered regions comprises a surface area having a greater roughness than an adjacent surface area.

10. The floor panel of claim 1, wherein a sealer and/or a topcoat is provided over the enhancement component.

11. The floor panel of claim 1, wherein in a first area the density number is 1 or below 1, while in a second area the density number is above 1.

12. A method for manufacturing a floor panel, said method comprising the steps of:
    (a) preparing a semi-finished product comprising a substrate, a decorative layer and a transparent component, wherein said decorative layer is positioned between the substrate and the transparent component and wherein at least one of the substrate, the decorative layer and the transparent component comprises a thermoplastic synthetic material;
    wherein the method further comprises the step of:
    (b) applying an enhancement component to an upper surface of said transparent component, said upper surface being opposite the decorative layer, in such a manner that a thickness of the enhancement component varies along a cross section of the floor panel;
    wherein said enhancement component is a lacquer or paint;
    wherein said enhancement component is semi-transparent or opaque;
    wherein said enhancement component comprises at least two areas having mutually different opacities, wherein each of the opacities is expressed by a density number measured with a reflection densitometer.

13. The method of claim 12, wherein step (b) further comprises applying said enhancement component in a discontinuous manner, so that said upper surface comprises one or more covered regions, which are covered by the enhancement component, and one or more free regions, which are not covered by the enhancement component.

14. The method of claim 12, wherein said method further comprises the step of:
    (c) embossing said semi-finished product, thereby forming a relief in the upper surface of the transparent component, said relief comprising recesses,
    and wherein step (b) comprises providing the enhancement component in some of the recesses.

15. The method of claim 13, wherein the method further comprises the step of:
    (d) on the upper surface of the transparent component, creating at least one surface area having a greater roughness than an adjacent surface area;
    wherein at least one of said covered regions comprises the at least one surface area having the greater roughness.

16. The method of claim 12, wherein the method further comprises the step of:
    (e) applying a topcoat over the enhancement component.

17. The method of claim 16, wherein the method further comprises the step of:
    (f) applying a sealer over the enhancement component before applying said topcoat.

18. The method of claim 12, wherein step (b) is carried out in a plurality of application steps.

19. The method of claim 17, wherein prior to applying said topcoat to said sealer, the method comprises the step of mechanically treating the covered upper surface of the transparent component, for example by grinding and/or brushing.

20. The floor panel of claim 12, wherein in a first area the density number is 1 or below 1, while in a second area the density number is above 1.

* * * * *